United States Patent [19]

Yamada et al.

[11] Patent Number: 5,521,038

[45] Date of Patent: May 28, 1996

[54] RECORDING METHOD FOR AN OPTICAL RECORDING MEDIUM

[75] Inventors: Takashi Yamada; Makoto Okano; Shingo Iwasaki; Fumio Matsui, all of Saitama, Japan

[73] Assignee: Pioneer Electronic Corporation, Tokyo, Japan

[21] Appl. No.: 397,715

[22] Filed: Mar. 2, 1995

Related U.S. Application Data

[63] Continuation of Ser. No. 148,325, Nov. 8, 1993, abandoned.

[30] Foreign Application Priority Data

Nov. 10, 1992 [JP] Japan ..................... 4-299391

[51] Int. Cl.⁶ ........................................ G11B 7/00
[52] U.S. Cl. ................ 430/30; 430/269; 430/270.16; 430/945
[58] Field of Search ............................ 430/495, 945, 430/269, 270; 369/288

[56] References Cited

U.S. PATENT DOCUMENTS

| | | | |
|---|---|---|---|
| 4,458,004 | 7/1984 | Tanikawa | 430/270 |
| 4,529,688 | 7/1985 | Law et al. | 430/494 |
| 4,946,762 | 8/1990 | Albert et al. | 430/270 |
| 5,132,153 | 7/1992 | Hirose et al. | 428/64 |
| 5,137,798 | 8/1992 | Duggan et al. | 430/270 |
| 5,248,538 | 9/1993 | Kovacs et al. | 428/64 |
| 5,303,217 | 4/1994 | Bakx et al. | 369/48 |

*Primary Examiner*—Charles L. Bowers, Jr.
*Assistant Examiner*—John A. McPherson
*Attorney, Agent, or Firm*—Nikaido Marmelstein Murray & Oram

[57] ABSTRACT

An optical recording medium has a substrate and a recording film of phthalocyanine coloring matter provided on the substrate. A recording power is determined in such a manner that a β value represented by the following equation becomes a value between −0.3 and 0

$$\beta = (A1+A2)/(A1-A2)$$

where A1 represents a peak level in a plus range and A2 represents a peak level in a minus range of a reproduced signal coupled with alternating current.

1 Claim, 2 Drawing Sheets

RECORDING METHOD FOR AN OPTICAL RECORDING MEDIUM

This application is a continuation of application Ser. No. 08/148,325 filed Nov. 8, 1993, now abandoned.

BACKGROUND OF THE INVENTION

The present invention relates to an optical recording medium such as a writable disc and readable disc, and more particularly to a method for recording information on a recording medium which has a light-transmissible substrate, a recording film made of organic coloring matter such as phthalocyanine coated on the substrate, and a reflection film covered on the recording film.

In a recording film of a writable optical recording medium, it is well known to use organic coloring matter such as cyanine.

As a method for writing information on the recording medium, a laser beam is focused on the recording film at a small area and converted into thermal energy so that the characteristic of the recording film is changed to form a pit. In order to properly change the characteristic of the recording film, two sheets of the recording mediums comprising a substrate and a recording film coated on the substrate is prepared. The recording films are disposed opposite to each other, interposing air therebetween, so called air sandwich construction.

A transparent substrate is irradiated with a laser beam for writing information and the pit is formed on the recording film. A laser beam for reading the recorded information has a rather weak power compared with the writing laser beam. The contrast between the pit and the area other than the pit is detected as an electric signal.

Besides the above mentioned recording medium, a recording medium on which information has been already recorded is provided. It is a read only memory (ROM) type recording medium which is widely used in the sound recording field and information processing field. In such a recording medium, it is not necessary to provide the writable recording film and prepits corresponding data to be reproduced are previously formed on a plastic substrate by press. A metallic reflection film made of Au, Ag, Cu, or Al is coated on the substrate and a protection film is covered on the reflection film. The most typical example thereof is a compact disc (CD). The format of writing and reading signal of the CD is standardized and the reproducing device of the CD is widely used as a CD player.

Since the writable recording medium uses a laser beam and is in the form of a disc, it is the same as the CD. Therefore, it has developed to adapt the recording medium to be played by the CD player.

In the conventional writable optical recording medium having the recording film of cyanine, a recording power of the laser beam must be properly determined in accordance with the characteristic of the recording medium, that is the characteristic of the reproduction signal which called $\beta$ value. More specifically, the recording power is determined so that the $\beta$ value becomes 0.04.

However, it has been found as a result of research that the $\beta$ value 0.04 is only effective to the recording film made of cyanine or a recording film having the same characteristic change as the cyanine film and is improper to a recording film made of phthalocyanine. If the recording film of phthalocyanine is irradiated with the laser beam of a recording power dependent on the $\beta$ value 0.04, disadvantages such as increase of the block error rate (BLER) occur.

SUMMARY OF THE INVENTION

An object of the present invention is to provide a recording method for an optical recording medium of phthalocyanine in which the $\beta$ value is properly determined, thereby providing an optimum recording power of a laser beam for recording information on the medium.

According to the present invention, there is provided a method for recording information on an optical recording medium having a substrate and a recording film of phthalocyanine coloring matter provided on the substrate comprising determining a recording power in such a manner that a $\beta$ value represented by the following equation becomes a value between −0.3 and 0

$$\beta=(A1+A2)/(A1-A2)$$

where A1 represents a peak level in a plus range and A2 represents a peak level in a minus range of a reproduced signal coupled with alternating current.

The other objects and features of this invention will become understood from the following description with reference to the accompanying drawings.

DETAILED DESCRIPTION OF THE PREFERRED EMBODIMENT

Figure 1:
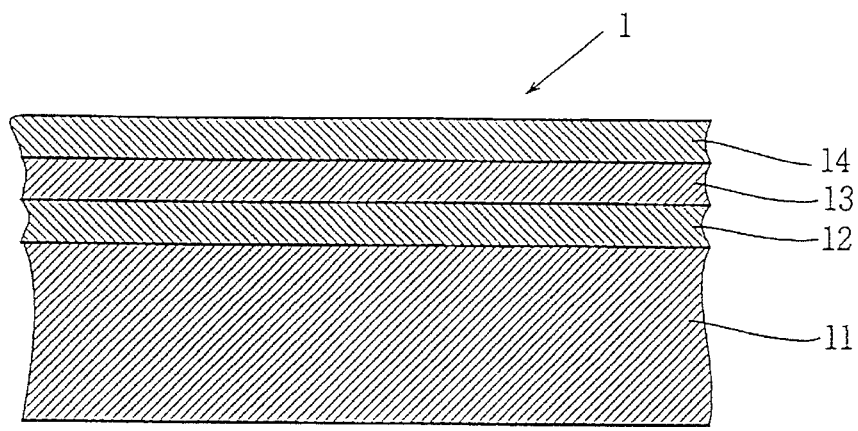
FIG. 1 is an enlarged sectional view partly showing an optical recording medium according to the present invention.

Referring to FIG. 1 showing an optical recording medium of the present invention, an optical recording medium 1 comprises a light-transmissible substrate 11 in the form of a disc, a recording film 12 coated on the substrate 11, a reflection film 13 coated on the recording film 12, and a protection film 14 covering the reflection film 13.

The substrate 11 is made of transparent material such as polycarbonate (PC) resin or polymethylmethacrylate (PMMA) resin and formed by injection molding in consideration of productivity. A coaxial tracking pregroove or a spiral tracking pregroove is formed on the substrate 11 at the underside.

Alternatively, the substrate may be formed by the photo-Polymer method. The thickness of the substrate 11 is about 1.0 to 1.5 mm.

The recording film 12 coated on the substrate 11 contains organic coloring matter, for example, phthalocyanine coloring matter. The phthalocyanine coloring matter is represented by the general formula [1] as follows.

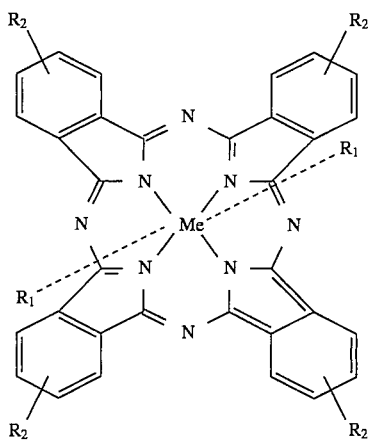

(I)

wherein $R_1$ is selected from alkyl group which may have a substituent, hydrogen atom, halogen atom, hydroxyl group, $-OR^{15}$, $-SR^{15}$, $-SeR^{15}$, $-TeR^{15}$,

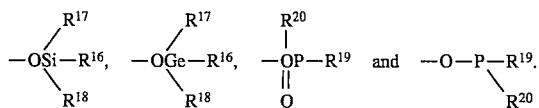

$R^{15}$ is selected from alkyl group which may have a substituent, aryl group which may have a substituent, cycloalkyl group which may have a substituent, and polyether group.

$R^{16}$, $R^{17}$, and $R^{18}$ may be either the same or the difference and are selected from alkyl group which may have a substituent, cycloalkyl group which may have a substituent, aryl group which may have a substituent, alkoxy group which may have a substituent, aryloxy group which may have a substituent, polyether group, hydroxyl group, and hydrogen atom.

$R^{19}$ and $R^{20}$ may be either the same or the difference and are selected from alkyl group which may have a substituent, cycloalkyl group which may have a substituent, and aryl group which may have a substituent.

$R_2$ is selected from alkyl group which may have a substituent independently, alkoxy group which may have a substituent, heterocyclic residue which may have a substituent, halogen atom, nitro group, cyano group, or sulfonic group.

Me is a metal. Particularly, Si, V, Fe or Al is preferable.

The organic coloring matter is dissolved by a solvent and coated on the substrate 11 by a normal method such as spin coating so that the recording film 12 is formed. The thickness of the film 12 is about 10 to 1000 nm, preferably 100 to 500 nm. If the thickness is less than 10 nm, the recording film lacks recording sensitivity. If the thickness exceeds 1000 nm, reflectance becomes insufficient.

The solvent is selected from such a material, for example, diacetone alcohol, ethyl cellosolve, methyl cellosolve, isophorone, methanol, or tetrafluoropropanol.

The reflection film 13 coated on the recording film 12 is made of metal such as Au, Al, Ag or Cu and coated by vacuum deposition, cathode sputtering, or ion plating. The thickness of the film 13 is about 0.02 to 2.0 μm.

As the protection film 14 for protecting films 12 and 13, a resin hardened by ultraviolet ray is used and covered by spin coating. Alternatively, epoxy resin, acrylic resin, silicon or urethane resin is used. The thickness of the film 14 is about 0.1 to 100 μm.

Figure 2:
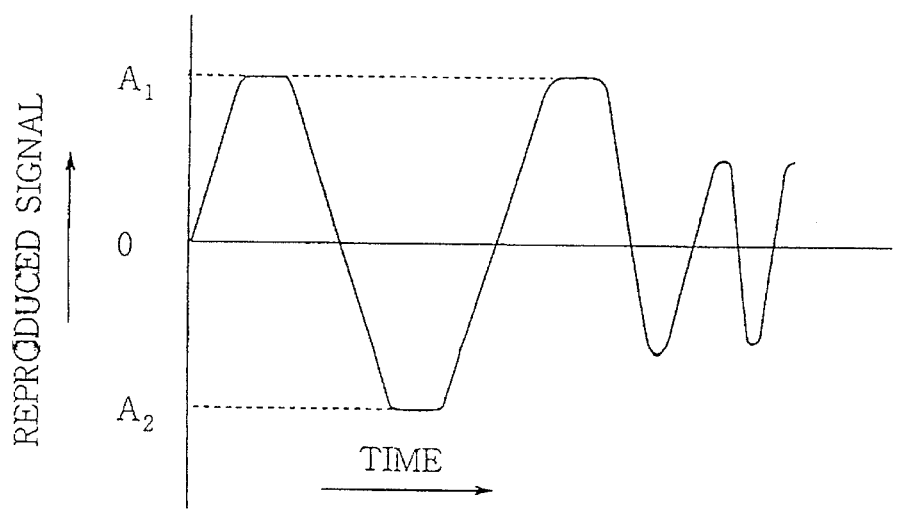
FIG. 2 shows a waveform of a characteristic value $\beta$ of a recording signal of the recording medium.

The value β of the recording film is represented by the following equation.

$$\beta=(A1+A2)/(A1-A2)$$

where A1 represents a peak level in a plus range shown in FIG. 2 and A2 represents a peak level in a minus range of a reproduced signal coupled with alternating current.

The recording power is preferably determined between −0.3 and 0, more preferably between −0.25 and −0.1, and furthermore between −0.2 and −0.15.

If the recording power of the laser beam is determined in dependence on the β value, an optimum recording power is obtained. If the β value exceeds zero, crosstalk will occur, the BLER is increased and a tracking error signal will be fluctuated. If the β value is less than −0.3, jitter will occur, and the BLER and the reproducing signal are deteriorated.

An interlayer may be provided between the substrate 11 and the recording film 12 for protecting the substrate 11 from the solvent. An enhancement film may be provided between the films 12 and 13 for increasing reflectance of a reproduced light reflected on the underside of the substrate. As the enhancement film, non-organic material such as magnesium fluoride ($MgF_2$) or organic material such as polyvinyl alcohol is used. It is preferable to provide a top coat film made of organic material on the underside of the substrate for controlling the reflectance. The top coat film is made of fluorocarbon resin or silicone.

In operation, the disc is rotated and the irradiated with a laser beam in the form of pulses. A part of the recording film is melted and removed so that pits are formed. The pits are irradiated with the laser beam at the reproduction of the disc and read by detecting the difference between the injected light and the reflected light.

The present invention will be described in detail with reference to a concrete test.

EXAMPLE

Phthalocyanine coloring matter specified by the following formula is melted in the solvent of ethyl cellosolve to make a solution for the recording film. The solution is coated on the substrate 11 which is made of polycarbonate having 12 cm in diameter by spin coating to the thickness about 200 nm, so that the recording film 12 is formed.

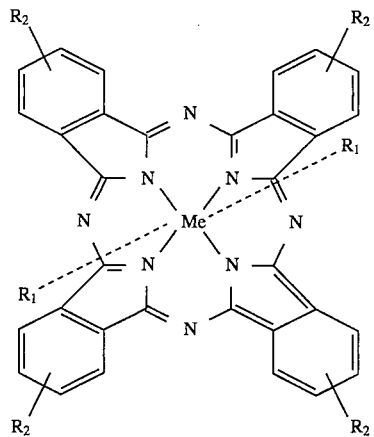

-continued

Me: Si
$R_1$: OP—(Ph)$_2$  Ph = benzen ring
     ‖
     O
$R_2$: OCH$_2$CF$_2$CF$_2$H (substitution position: 3 or 6 position)

The reflection film 13 made of Au is coated at the thickness 1000 Å by vacuum deposition of resistor heating type. The protection film 14 made of ultraviolet ray hardening acrylate resin is covered at the thickness about 4 μm.

Figure 3:
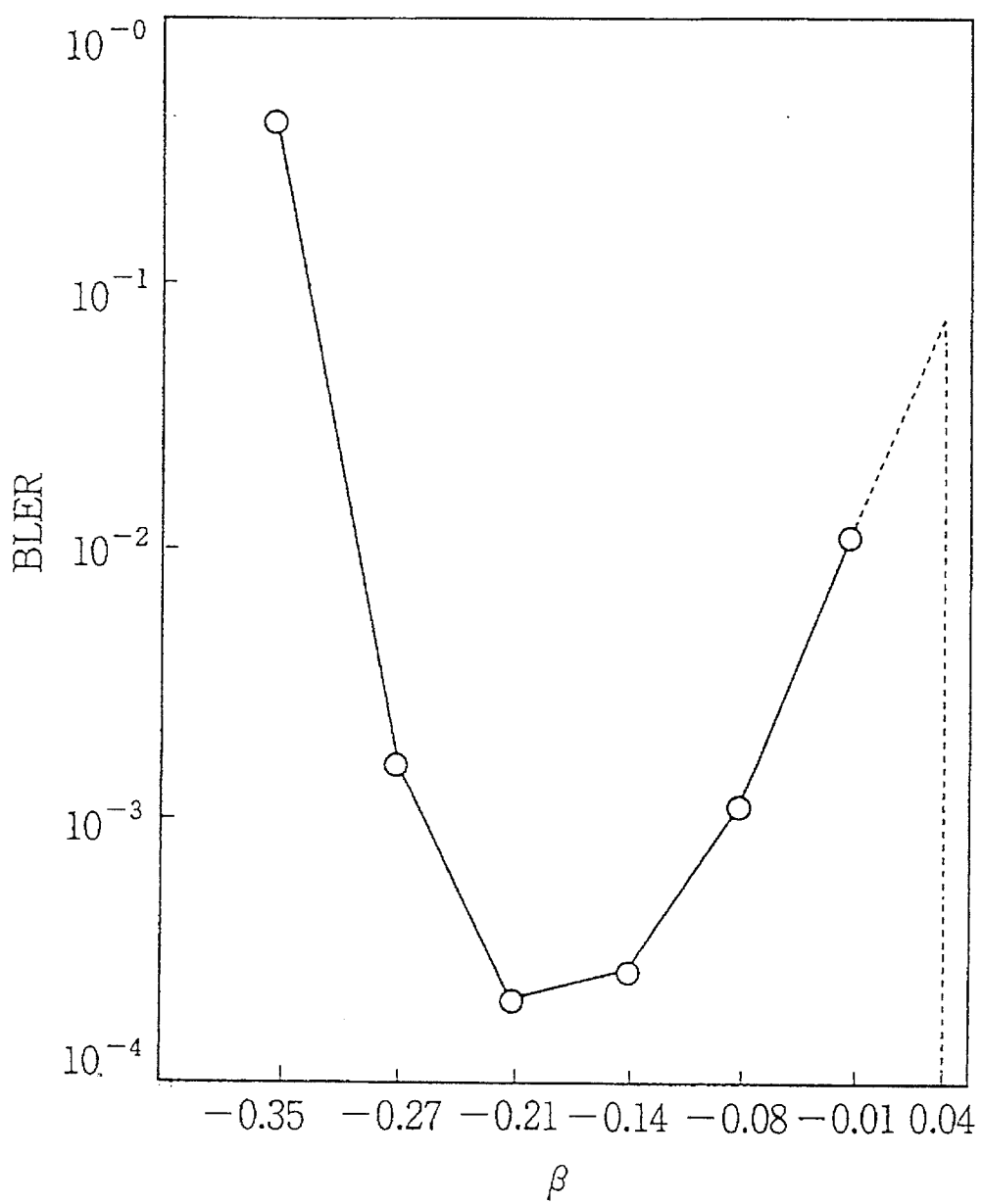
FIG. 3 is a graph showing the relationship between the block error rate and the value B.

In the example, an EFM signal is recorded by changing the recording power based on the β value and the BLER is measured. FIG. 3 shows a result of the test. It will be seen that the BLER corresponding to the β value of the present invention is extremely low. The BLER in the conventional value 0.04 is high.

In accordance with the present invention, the β value is determined between −0.3 and 0 so as to obtain an optimum recording power. Thus, the information is recorded with the recording power having good recording characteristics.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method for recording information on an optical recording medium having a substrate and a recording film of a phthalocyanine coloring matter provided on the substrate, the phthalocycanine coloring matter being selected from compounds represented by the following formula:

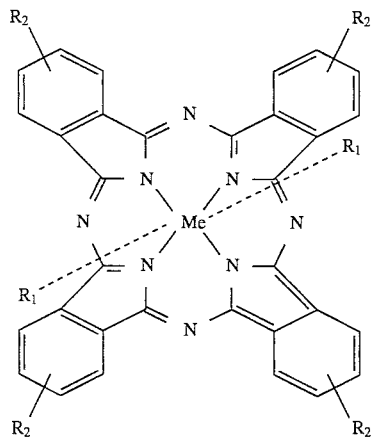

wherein $R_1$ is selected from the group consisting of alkyl group which may have a substituent, hydrogen atom, halogen atom, hydroxyl group, -OR$^{15}$, -SR$^{15}$, -SeR$^{15}$, -TeR$^{15}$

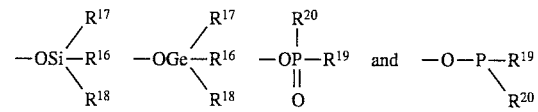

$R^{15}$ is selected from the group consisting of alkyl group, aryl group, cycloalkyl group, and polyether group, $R^{16}$ $R^{17}$ and $R^{18}$ may be either the same or different and are selected from the group consisting of alkyl group, cycloalkyl group, aryl group, alkoxy group, aryloxy group, polyether group, hydroxyl group, and hydrogen atom, $R^{19}$ and $R^{20}$ may be either the same or different and are selected from the group consisting of alkyl group, cycloalkyl group, and aryl group which may have a substituent, and $R_2$ is selected from the group consisting of alkyl group which may have a substituent independently, alkoxy group which may have a substituent, heterocyclic residue which may have a substituent, halogen atom, nitro group, cyano group, and sulfonic group, Me is a metal, comprising:

determining a recording power in such a manner that a β value represented by the following equation becomes a value between −0.3 and 0

$$\beta=(A1+A2)/(A1-A2)$$

where A1 represents a peak level in a plus range and A2 represents a peak level in a minus range of a reproduced signal coupled with alternating current;

recording the information with a laser beam having a recording power determined by the β value.

* * * * *